Oct. 24, 1950

C. T. WALTER 2,527,341

VALVE ACTUATING MECHANISM

Original Filed June 12, 1941

Charles T. Walter
INVENTOR

BY R. G. Story
ATTORNEY

Oct. 24, 1950     C. T. WALTER     2,527,341
VALVE ACTUATING MECHANISM
Original Filed June 12, 1941     4 Sheets-Sheet 2

Charles T. Walter
INVENTOR
BY R. G. Story
ATTORNEY

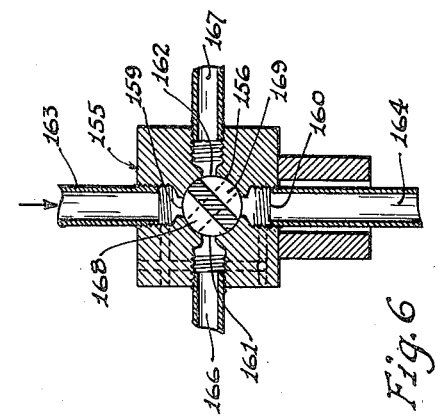
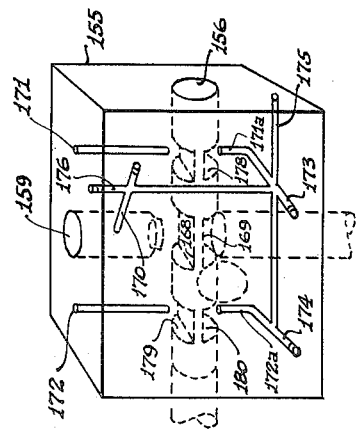
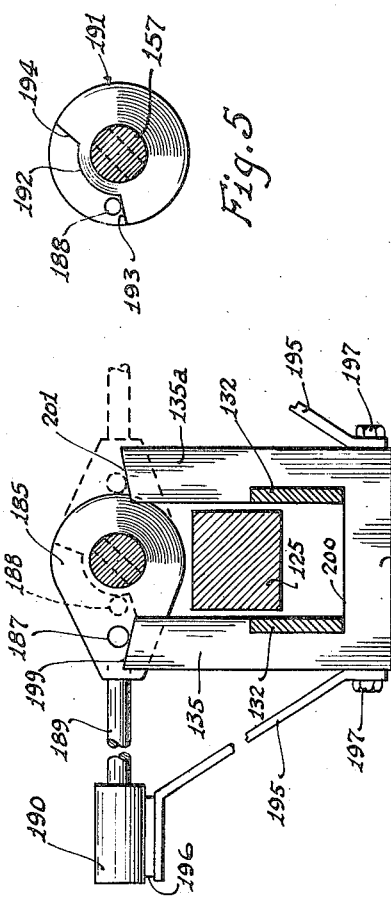
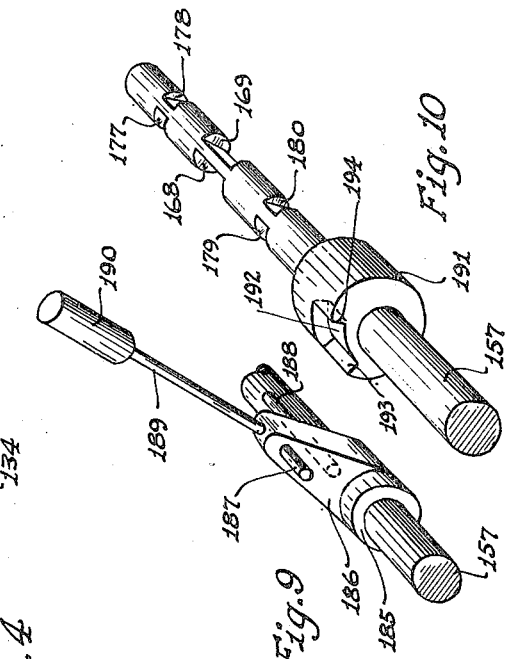

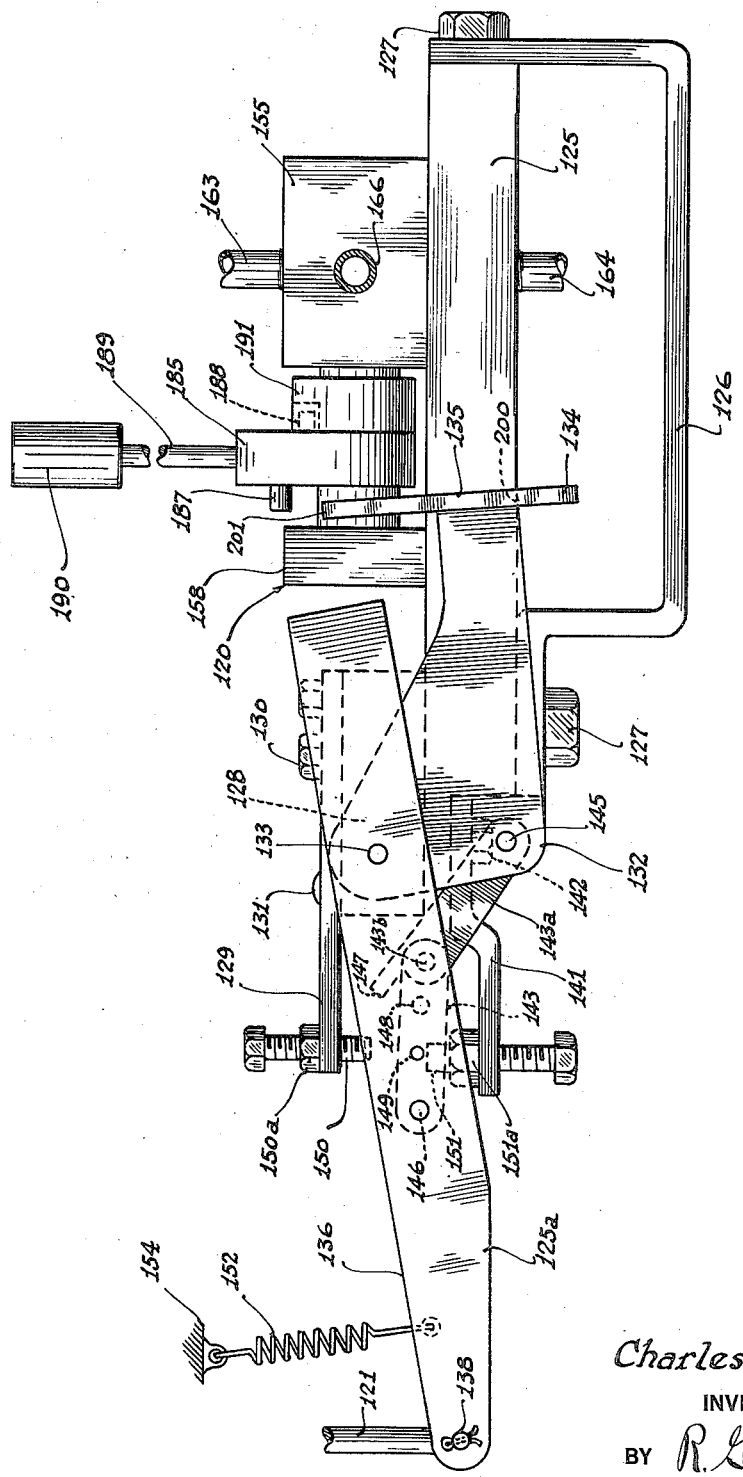

Patented Oct. 24, 1950

2,527,341

UNITED STATES PATENT OFFICE 2,527,341

VALVE ACTUATING MECHANISM

Charles T. Walter, Chicago, Ill., assignor, by mesne assignments, to Swift & Company, a corporation of Illinois Original application June 12, 1941, Serial No. 397,690. Divided and this application July 26, 1944, Serial No. 546,607

6 Claims. (Cl. 74—520)

This invention relates to a valve operating apparatus and more particularly to a valve operating apparatus for use in conjunction with a container filling machine.

To show an application of this invention, the valve operating apparatus is described in cooperation with a filling machine such as is described and claimed in my copending application for a filling machine bearing Serial No. 397,690, filed June 12, 1941, now Patent No. 2,376,838, which filling machine has been provided for use in extruding plastic or semi-solid materials into containers and has particular application for use in the handling of products such as ground cheese, ground meat and the like.

The machine shown in the above mentioned copending application includes a metering cylinder adapted to have a plastic or semi-solid material introduced thereinto under pressures and a metering piston reciprocably mounted in the cylinder to displace material therefrom. The metering cylinder is preferably of the double acting type and the admission of material into and the discharge of material from the metering cylinder is controlled by a suitable valve such as a four-way valve. A booster cylinder containing a booster piston connected to the metering piston is provided to forcibly reciprocate the metering piston in the metering cylinder to displace a predetermined quantity of material therefrom on each stroke of the piston, the metering piston forcing material out of one end of the metering cylinder while the means for introducing material under pressure into the other end of the metering cylinder, is refilling the bore of the metering cylinder on the trailing side of the metering piston. A suitable valve, such as a four-way falve, controls the admission and exhaust of operating fluid to the booster cylinder and this valve is interconnected with the valve of the metering cylinder so that the action of the pistons in the two cylinders is synchronized. The booster piston is preferably operated by air under pressure because air lends itself to speedy operation, although any pressure fluid may be utilized.

In order to speed up operation of the apparatus the control valves of the metering and booster cylinders are actuated by a power cylinder, which in turn is controlled by another valve, such as a four-way valve, operable automatically upon the positioning of an empty container in the filling position.

The present invention is concerned with the valve mechanism for controlling the operation of the filling cycle of the machine.

It is, therefore, the principal object of this invention to provide a container filling apparatus which operates automatically upon the positioning of an empty container in filling position.

Another object of the invention is to provide a container filling apparatus arranged and constructed so that it is easy to operate and which requires only a minimum of effort on the part of the operator.

Still another object of the invention is to provide a semi-automatic valve for controlling the operation of the container filling apparatus and the like.

A further object of the invention is to provide a novel actuating mechanism for said automatic valve.

A still further object of the invention is to provide a valve construction in which the pressure acting upon the core thereof is balanced.

Other and further objects of the invention will be apparent from the further description taken from the accompanying drawings in which:

Figure 4 is a sectional view through the valve taken on line 4—4 of Figure 2;

Figure 5 is a sectional view taken on line 5—5 of Figure 2;

Figure 6 is a sectional view taken on line 6—6 of Figure 2;

Figure 7 is a diagrammatic perspective view particularly illustrating the arrangement of the main and balancing ports of the valve block and valve core of a semi-automatic valve;

Figure 8 is a view somewhat similar to Figure 2 but illustrating the relative position that the parts of the valve mechanism assume during the actuation of the semi-automatic control valve;

Figure 9 is a perspective view of the pendulum or operating arm for actuating the semi-automatic control valve; and Figure 10 is a perspective view of the core of the semi-automatic control valve.

The invention described herein has been divided out of my aforementioned copending application for a filling machine and this first filed application may be referred to for a description of the general construction and operation of the filling machine itself. The present invention is concerned with the valve operating means for rendering automatic, the operation of such a filling machine or the like.

Figure 1:
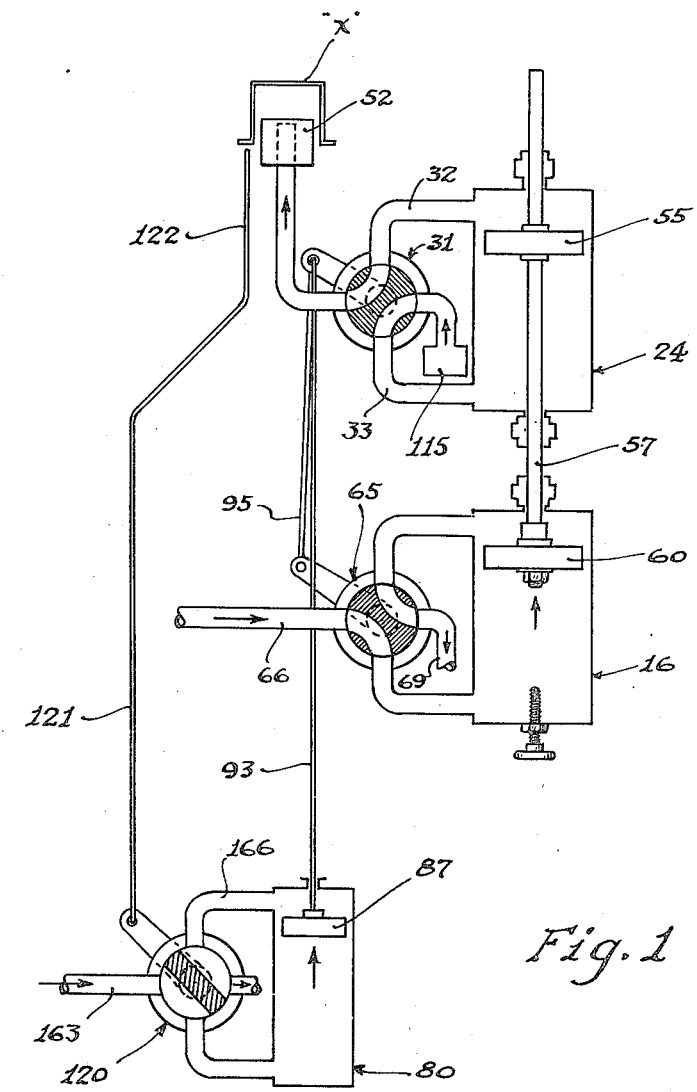
Figure 1 is a diagrammatic view of one form of a filling apparatus showing an application of this invention in which the power cylinder for controlling the valves of the metering cylinder and booster cylinder is operated semi-automatically and incidental to the positioning of an empty container upon the filling mandrel.

The container filling apparatus of my prior application is here illustrated in a form showing it to be substantially automatic and Figure 1 constitutes a diagrammatic representation of the apparatus. In this form of the machine a metering cylinder 24 and a four-way valve 31 are shown and the booster cylinder 16 and four-way valve 65 for controlling the admission of a pressure fluid from conduit 66 into and the exhaust of the fluid into conduit 69 from the booster cylinder. A connecting rod 57 connects the metering piston 55 with a booster piston 60. A power cylinder 80 contains a power piston 87 which is connected by means of links 93 and 95 to the valves 31 and 65 respectively in order to simultaneously actuate said valves. A four-way valve 120 is provided for controlling the admission and exhaust of air from the power cylinder 80. A device 115 introduces plastic or semi-solid material under pressure into metering cylinder 24, through valve 31 and passageways 32 and 33.

In order to render the container-filling apparatus semi-automatic in its operation, an upright rod 121 is positioned with the upper end 122 thereof disposed adjacent one side of a filling mandrel 52 so that the rim of a container X will engage said end as said container is mounted upon the mandrel for filling. As will be apparent from Fig. 1, a sudden or rapid movement of the container X downwardly upon the filling mandrel 52 will impart a like movement to the rod 121. Such downward movement of the rod 121 is utilized to actuate the power cylinder control valve 120 for admitting and exhausting air from the power cylinder 80, as will be explained hereinafter. The lower end 123 of the rod 121 carries a saddle 124 (Fig. 2) adapted to engage a part of the mechanism of the valve 120 to effect actuation thereof.

Figure 2:
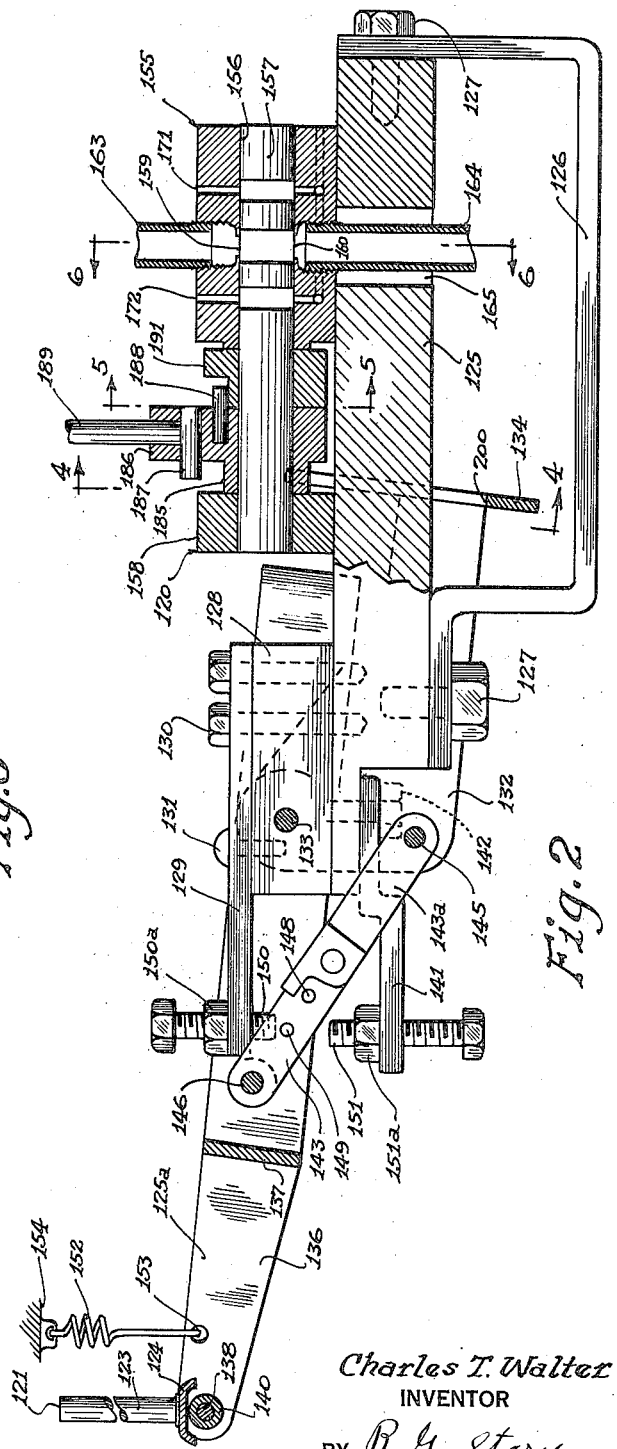
Figure 2 is a side elevational view, partly in section, of the semi-automatic valve employed to control the operation of the power cylinder.

Figs. 2 to 10, inclusive, illustrate in detail the semi-automatic control valve 120 for the power cylinder 80. As shown in Fig. 2, the valve 120 comprises a main body portion 125 secured to a mounting bracket 126 by bolts 127. The bracket 126 may be mounted upon the apparatus in any suitable place. A block 128 rests upon the upper surface of the body 125 at one end thereof and a plate 129 overlies said block, said plate and block being secured to said body by suitable bolts 130. The plate 129 is further secured to the block 128 by relatively short bolts 131. A pair of arms 132, one disposed upon each side of the body 125, is pivotally connected to said body by a pin 133. The opposite ends of said arms are connected together by a generally U-shaped plate 134 arranged so that its legs 135 and 135ª straddle the body 125, as best shown in Fig. 4.

Figure 3:
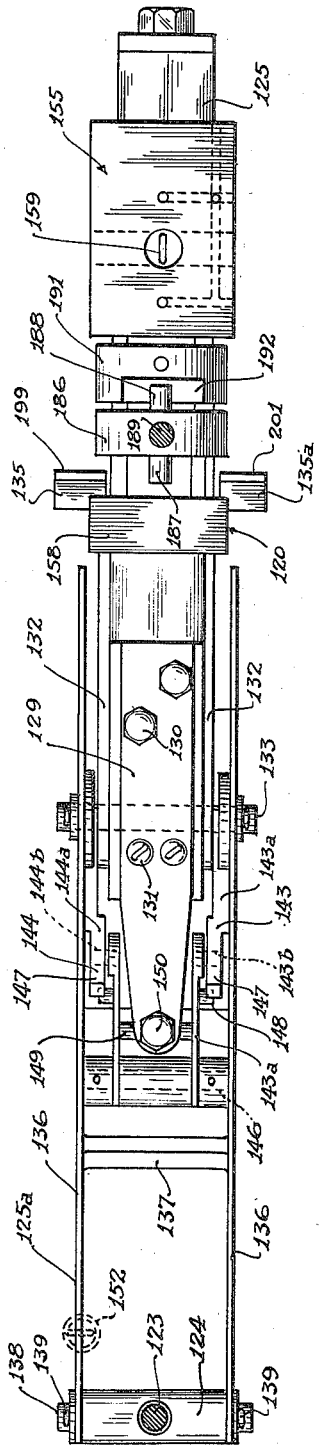
Figure 3 is a plan view of the valve shown in Figure 2.

A rigid frame 125ª comprising a pair of bars 136 is pivotally mounted upon the pin 133 exteriorly of the arms 132, as is best shown in Fig. 3. The bars 136 are rigidly connected together intermediate their ends by a cross brace 137 which may be secured in place by welding, or otherwise. The ends of the bars 136 remote from the pivot pin 133 carry a pin 138 held in place by cotter pins 139. A sleeve 140 surrounds the pin 138 and serves as a spacer for the free ends of the bars 136. The sleeve 140 is adapted to be engaged by the saddle 124 carried by the lower end of the rod 121, as indicated in Fig. 2. A second plate 141 is arranged in spaced relation to the plate 129 and is secured to the body 125 by means of a bolt 142.

A pair of toggle members 143 and 144, respectively, is disposed between the arms 132 and the rigid frame 125ª. Each of said toggle members comprises a pair of links 143ª and 144ª, respectively, one of which links is pivotally connected to the arms 132 at 145 and the other of which is pivotally connected to the frame 125ª at 146. The respective links of the toggle members 143 and 144 are pivotally connected together at 143ᵇ and 144ᵇ. The links connected to the arms 132 include a longitudinal extension 147 adapted to engage with a pin 148 carried by the other of said links to maintain said links in a substantially straight line so that a thrust force can be transmitted therethrough. The upper links of the toggle members 143 and 144 are connected by a transverse pin 149 disposed between spaced stops or abutments 150 and 151 carried by the plates 129 and 141, respectively. The stops 150 and 151 may take the form of bolts threadedly mounted in said plates to provide for adjustment thereof relative to each other. Lock nuts 150ª and 151ª serve to maintain the stops 150 and 151 in the desired position of adjustment. One end of the frame 125ª is connected to one end 153 of a tension spring 152 and the opposite end of said spring is secured to a suitable fixed element 154 of the machine. The spring 152 is arranged to exert an upward force on the frame 125ª to return said frame to its initial position after depression of the rod 121 and to engage the transverse pin 149 with the stop 150 to effect straightening of the toggle members 143 and 144.

The body 125 of control valve 120, carries a valve block generally indicated at 155. The valve block 155 is provided with a longitudinal bore 156 adapted to receive one end of a valve core 157. The opposite end of said valve core is suitably supported in a bearing block 158. The valve block 155 and bearing block 158 may be welded or otherwise secured to the body 125. The valve block 155 is further provided with main ports 159 and 160 extending vertically and intersecting the bore 156 as best shown in Fig. 6. The valve block 155 is further provided with main ports 161 and 162 which extend horizontally of said block and also intersect the bore 156.

An inlet pipe 163 for air under pressure is connected to the valve block 155 directly above the port 159 and an exhaust pipe 164 is connected to said block directly below the port 160, said exhaust pipe extending through a suitable opening 165 in the body 125 and opening to the atmosphere. A pipe 166 is connected to the valve block 155 at one side of the port 161 and communicates with one end of the power cylinder 80. A second pipe 167 is connected to the valve block 155 adjacent the port 162 and communicates with the opposite end of said power cylinder.

The valve core 157 is generally circular in cross-section and fits snugly in the bore 156. Portions of said core are cut away at a point in alignment with the passageways 159 to 162 to provide main ports 168 and 169 separated by a flat diametrical web. These ports cooperate with the main ports 159—162 of the valve block 155 to provide a four-way valve.

In order to reduce friction and facilitate ease of operation of the valve core 157, said valve core and valve block 155 are provided with a series of balancing ports, which will now be described.

In the course of manufacture of the valve block 155, a relatively small passageway 170 is angularly drilled in the side of said block so that it communicates with the main inlet port 159. A pair of spaced vertical ports 171 and 172 are drilled in the block 155 and intersect the valve bore 156 so that ports 171ª and 172ª are formed in said block below said bore. A horizontal passageway 173 communicates with the port 171ª and a second horizontal passageway 174 communicates with port 172ª. A longitudinal passageway 175 connects the passageways 173 and 174 and a vertical passageway 176 disposed upon one side of the bore 156 connects the passageways 170 and 175. The outer end of each of the passageways 170, 173, 174, 175 and 176 is plugged so as to prevent the escape of air under pressure from the valve block 155. The upper end of each of the ports 171 and 172, on the other hand, is left open so that these ports are always open to the atmosphere.

The valve core 157 has additional portions thereof cut away to provide a set of balancing ports 177 and 178 (Fig. 10) spaced longitudinally from the main ports 168 and 169, and a second set of balancing ports 179 and 180 on the other side of the ports 168 and 169. The ports 177 and 178 are separated by a diametrical web and are so located along the valve core 157 that they are in alignment with the ports 171 and 171ª. The ports 179 and 180 are also separated by a diametrical web and are located so that they are in alignment with the ports 172 and 172ª. It will be noted that the web separating the main ports 168 and 169 is disposed in the same plane as the webs separating the balancing ports 177—178 and 179—180, and it will be understood that the ports of the valve core are so designed that the sum of the projected areas of the webs of the balancing ports is equal to that of the web of the main ports.

It will be clear from the foregoing that when the valve core 157 is in the position shown in full lines in Fig. 6, air under pressure can enter the power cylinder 80 through the supply pipe 163, ports 159, 168, 161 and pipe 166; the web portion of the core between the ports 168 and 169 assuming an angle of repose of about 45°. Thus, the air pressure effective upon the port 168 resolves itself into components exerting downward and lateral thrust on the valve core 157. At the same time, these components are balanced by equal and opposite components effective upon the balancing ports 178 and 180 on the opposite side of the valve core 157; the air being admitted to act upon the port 178 through the passageways 170, 176, 173 and port 171ª, and to act upon the port 180 through the passageways 170, 176, 175, 174 and port 172ª. In the meantime, atmospheric pressure acting upon the main port 169 through exhaust pipe 164 and port 160 is balanced by atmospheric pressure acting upon the balancing ports 177 and 179 through the ports 171 and 172, respectively.

The valve core 157 is designed to be rotated through an angle of about 90°. Such rotation will position the web between the valve core ports in the position shown in dot-and-dash lines in Fig. 6. When the ports in the valve core 157 are in the dot-and-dash line position, the effective pressure on the valve core will be balanced in a manner similar to that previously described, except that the pressure on the port 169 will now be balanced by pressure acting upon the ports 177 and 179 and atmospheric pressure acting upon the port 168 will be balanced by atmospheric pressure acting upon the ports 178 and 180. In this manner, the effective pressure on the valve core is balanced at all times and said valve, therefore, can be readily turned in the valve block 155 by the application of only a slight turning force.

A hub member 185 is rotatably mounted upon the valve core 57 adjacent the bearing block 158. A lobe 186 projects radially from the hub 185 and carries pins 187 and 188, projecting from the opposite sides thereof. One end of a pendulum or operating arm 189 is rigidly secured to the lobe 186 and the opposite end of said arm carries a weight 190.

A collar 191 is non-rotatably secured to the core 157 between the hub 185 and the valve block 155. An arcuate recess or slot 192 formed in a side of said collar is adapted to receive the pin 188. The arcuate recess 192 terminates in substantially radial end walls 193 and 194 which serve as abutments for the pin 188, as will be described more fully hereinafter.

The pendulum arm 189, while it is free to rotate on the valve core 157, has its angle of movement limited by a stop means 195 located on opposite sides of member 125 (Fig. 4). Stop means 195 consists of a bracket designed as a buffer to take the impact of weight 190. Leather pad 196 is secured to the upper surface of the bracket which acts as a cushion. Brackets 195 are secured to member 125 by means of bolts 197.

The arm 189 and the weight 190 serve as a swingable pendulum arm for effecting rotation of the valve core 157. When there is no container upon the filling spout 52, the toggle members 143 and 144 assume the position shown in Fig. 2 and the pendulum arm 189 assumes the position shown in full lines in Fig. 4.

As an empty inverted container is moved downwardly relative to the filling spout 52, its rim engages the upper end of the rod 121 and causes said rod to move downwardly. The container is preferably moved downward quickly so as to impart a sudden movement to the rod 121. In view of the fact that the saddle 124 carried by the lower end of the rod 121 is engaged with the sleeve 140, it will impart a corresponding sudden downward movement to the free end of the rigid frame 125ª against the action of spring 152, thereby causing said frame to pivot about the pin 133. The links of the toggle members 143 and 144, being in alignment, transmit thrust from the frame 125ª to the arms 132 to cause said arms to similarly pivot about the pin 133. Upon continued downward movement of the rod 121, the transverse pin 149 will engage the stop 151 and pivot the upper of the toggle links about the pin 146, thus effecting a "break" in the toggle members. During the downward movement of the rod 121, and prior to the breaking of the toggle members 143 and 144, the striker 199 associated with the leg 135 will, of course, move upwardly and engage the pin 187 to impart an impulse to the pendulum arm 189 sufficient to overcome the inertia of the weight 190 and cause said arm to flop over through a vertical plane passing through the axis of rotation so that it comes to rest in the position indicated in dot-and-dash lines in Fig. 4. The impulse resulting in the aforedescribed actuation of the pendulum arm 189 is produced, as stated, prior to breaking of the toggle members 143—144 so that the rigid frame 125a can thereafter pivot downwardly independent of the arms 132 against the resistance offered by the spring 152. At the same time, further upward movement of the striker 199 would be limited by the engagement of the edge 200 of the U-shaped member 134 with the lower side of the body 125.

As will be noted from Fig. 4, the pendulum arm 189 with its weight 190 moves through a total angle of about 180°. The valve core 157, however, need only be moved through an angle of approximately 90° to shift the main ports 168 and 169 of said valve core from one operative position to the other. Hence, during about the first half of the travel of the pendulum arm 189 the pin 188 traverses the slot 192 and imparts no rotation to the valve core 157, but, as said arm reaches approximately its vertical position, said pin strikes against the abutment surface 194 of said slot and causes said valve core to thereafter rotate therewith through the remainder of its movement. Thus, a lost-motion connection is provided between the pendulum arm 189 and the valve core 157. By the time that the pin 188 engages the abutment surface 194, the pendulum arm 189 is traveling at a substantial velocity so that said pin strikes said abutment surface with a hammer-like effect and readily overcomes the inertia and any static friction that may be opposing free rotation of the valve core 157 in the valve block 155.

The pendulum arm 189 will now remain in the position shown in dot-and-dash lines in Fig. 4 until the container has been filled and removed from the mandrel 52. The removal of the container, or the gradual elevation of the container relative to the mandrel during the filling operation relieves the downward force acting upon the rod 121. As this force is released, the spring 152 pulls upwardly on the frame 125a causing it to pivot relatively to the pin 133. This relative movement carries the transverse pin 149 upwardly into engagement with the end of the stop 150 so that the toggle members become straightened, with the extension 147 engaging the pin 148. Meanwhile, a second striker 201 (Fig. 4) at the upper extremity of the leg 135a assumes a position a short distance below the pin 187 of the pendulum or operating arm 189 prepartory to engaging said pin to cause said arm to swing back to its original position and effect a second filling operation upon the next sudden depression of the rod 121.

It will be understood from the foregoing that the metering cylinder 24 and the booster cylinder 16 of the machine here shown operate in the same manner described in connection with metering cylinder 24 and the booster cylinder 16 of the machine shown in my above mentioned copending application, and that the use of the semi-automatic valve 120 of the present disclosure enables the filling of containers to proceed rapidly and efficiently without requiring the operator to use his hands or feet to actuate any specific control means for the power cylinder 80, the actuation of said cylinder and the remainder of the apparatus occurring automatically as empty containers are moved downward relatively to the mandrel 52. The automatic arrangement has the added advantage that the metering cylinder normally cannot be operated unless a container is in filling position.

It is contemplated that numerous variations and changes may be made in the structure of the apparatus disclosed herein without departing from the principles of the invention or the scope of the appended claims.

I claim:

1. A valve operating mechanism comprising: a body; a rigid frame pivotally mounted upon said body; a pair of arms pivotally mounted relative to said frame; toggle members interconnecting said frame and arms, each of said toggle members comprising a pair of links pivotally connected together; means normally maintaining the links of each toggle member in alignment so that a thrust force may be transmitted therethrough from said frame to said arms; striker means carried by said arms and adapted to engage a movable member upon a given downward movement of the free end of said rigid frame; and means for breaking said toggle members upon a predetermined pivotal movement of said rigid frame relative to said body.

2. A valve actuating mechanism carried on a relatively fixed support comprising: a body; a rigid frame pivotally mounted upon said body; a pair of arms pivotally mounted relative to said body; toggle members interconnecting said frame and arms, each of said toggle members comprising a pair of links pivotally connected together; means normally maintaining the links of each toggle member in alignment so that a thrust force may be transmitted therethrough from said frame to said arms; striker means carried by said arms and arranged to engage a valve operating arm upon a given downward movement of the free end of said rigid frame; means for breaking said toggle members upon a predetermined pivotal movement of the free end of said rigid frame relative to said body; and means interconnecting said support and said rigid frame normally tending to return the frame, arms, and toggle members to their initial position.

3. A valve actuating mechanism comprising: a body; a rigid frame; a pair of arms; means supporting said frame and arms for pivotal movement relative to each other and to said body; toggle members interconnecting said frame and arms, each of said toggle members comprising a pair of links pivotally connected together; means normally maintaining the links of each toggle member in alignment so that a thrust force may be transmitted therethrough from said frame to said arms; striker means carried by said arms and adapted to engage a movable valve actuating member upon downward movement of the free end of said rigid frame; means for breaking said toggle members upon a predetermined downward movement of the free end of said rigid frame; and spring means normally tending to return said frame and toggle members to their initial position.

4. A valve mechanism comprising: a body; a rigid frame pivotally mounted upon said body; a pair of arms pivotally mounted relative to said frame; toggle members interconnecting said frame and arms, each of said toggle members comprising a pair of links pivotally connected together; means normally maintaining the links of each toggle member in alignment so that a thrust force may be transmitted therethrough from said rigid frame to said arms; a striker means carried by said pivotally mounted arms and arranged to engage a movable valve operating arm upon a given downward movement of the free end of said pivotally mounted rigid frame; and means carried by said body for breaking said toggle members upon a predetermined pivotal movement of said rigid frame relative to said body.

5. A valve mechanism comprising: a body; a rigid frame; a pair of arms; means supporting said frame and arms for pivotal movement relative to each other and to said body; toggle members interconnecting said frame and arms, each of said toggle members comprising a pair of links pivotally connected together; means normally maintaining said links in alignment so that a thrust force may be transmitted therethrough from said frame to said arms; a pair of spaced stops carried by said body member; means between said stops fixed to one of the links of said toggle members and being adapted to engage with one of said stops upon pivotal movement of said frame relative to said body to effect breaking of said toggle members and to engage with the other of said stops upon return movement of said frame to effect alignment of said toggle links; striker means carried by said arms and arranged to engage a movable valve operating arm prior to breaking of said toggle members to impart an impulse to said operating arm and means connected with said frame normally tending to return the same to its initial position.

6. A valve-operating mechanism comprising: a body; a rigid element pivotally mounted upon said body; an arm means pivotally mounted relative to said rigid element; toggle means interconnecting said rigid element and said arm means, said toggle members being pivotally connected together; means normally maintaining the links of said toggle members in alignment so that a thrust force may be transmitted therethrough from said rigid element to said arm means; striker means carried by said arm means and adapted to engage a movable member upon a given downward movement of the free end of said rigid element; and means for breaking said toggle members upon a predetermined pivotal movement of said rigid element relative to said body.

CHARLES T. WALTER.

REFERENCES CITED

The following references are of record in the file of this patent:

UNITED STATES PATENTS

| Number | Name | Date |
|---|---|---|
| 350,126 | Frost | Oct. 5, 1886 |
| 353,219 | Haydn | Nov. 23, 1886 |
| 387,008 | Perry | July 31, 1888 |
| 665,887 | Emery | Jan. 15, 1901 |
| 927,796 | Hawkins | July 13, 1909 |
| 1,137,517 | Nelson | Apr. 27, 1915 |
| 1,322,333 | Noonan | Nov. 18, 1919 |
| 1,574,604 | Chamberlain | Feb. 23, 1926 |
| 2,004,194 | De Lacy-Mulhall | June 11, 1935 |
| 2,053,886 | Williams | Sept. 8, 1936 |
| 2,229,933 | Parker | Jan. 28, 1941 |
| 2,233,934 | Backhouse | Mar. 4, 1941 |
| 2,280,246 | McCullough | Apr. 20, 1942 |

FOREIGN PATENTS

| Number | Country | Date |
|---|---|---|
| 308,643 | Italy | June 10, 1933 |